United States Patent [19]

Moore et al.

[11] Patent Number: 4,911,637
[45] Date of Patent: Mar. 27, 1990

[54] FLAME TREATMENT METHOD AND APPARATUS

[75] Inventors: Colin Moore, Bradford; Michael T. Bishop, Bingley, both of Great Britain

[73] Assignee: The BOC Group plc, Windlesham, England

[21] Appl. No.: 237,606

[22] Filed: Aug. 26, 1988

[30] Foreign Application Priority Data

Aug. 29, 1987 [GB] United Kingdom ............... 8720468

[51] Int. Cl.[4] ........................ F23C 5/00; F23D 1/00
[52] U.S. Cl. ................................. 431/8; 431/252; 431/181; 110/263; 239/297
[58] Field of Search ............... 431/8, 252, 354, 181; 239/295, 297, 418, 433; 110/263, 309, 313, 147; 432/13, 19, 159, 195

[56] References Cited

U.S. PATENT DOCUMENTS

| | | | |
|---|---|---|---|
| 3,284,069 | 11/1966 | Levaux | 431/8 X |
| 4,510,874 | 4/1985 | Hasenack | 110/263 X |
| 4,519,321 | 5/1985 | Poll et al. | 239/295 X |
| 4,577,567 | 3/1986 | Moore et al. | 110/347 |
| 4,591,331 | 5/1986 | Moore | 431/16 |
| 4,622,905 | 11/1986 | MacDougall et al. | 110/347 |

FOREIGN PATENT DOCUMENTS

| | | | |
|---|---|---|---|
| 1060237 | 12/1983 | U.S.S.R. | 239/297 |
| 2099132 | 12/1982 | United Kingdom . | |
| 2146758 | 4/1985 | United Kingdom . | |
| 2141815 | 7/1986 | United Kingdom . | |

Primary Examiner—Randall L. Green
Attorney, Agent, or Firm—David A. Draegert; Larry R. Cassett

[57] ABSTRACT

An oxygen-fuel burner has a pipe 20 for fuel, for example pulverized coal carried in air, and two pipes 22 and 24 for oxygen. The burner is typically mounted horizontally above a burden to be heated. The oxygen pipes 22 and 24 have separate outlets disposed such that the flame is caused to curve towards the burden. The relative rates of supply of oxygen to the two passages are varied so that the flame is moved across at least part of the burden.

15 Claims, 3 Drawing Sheets

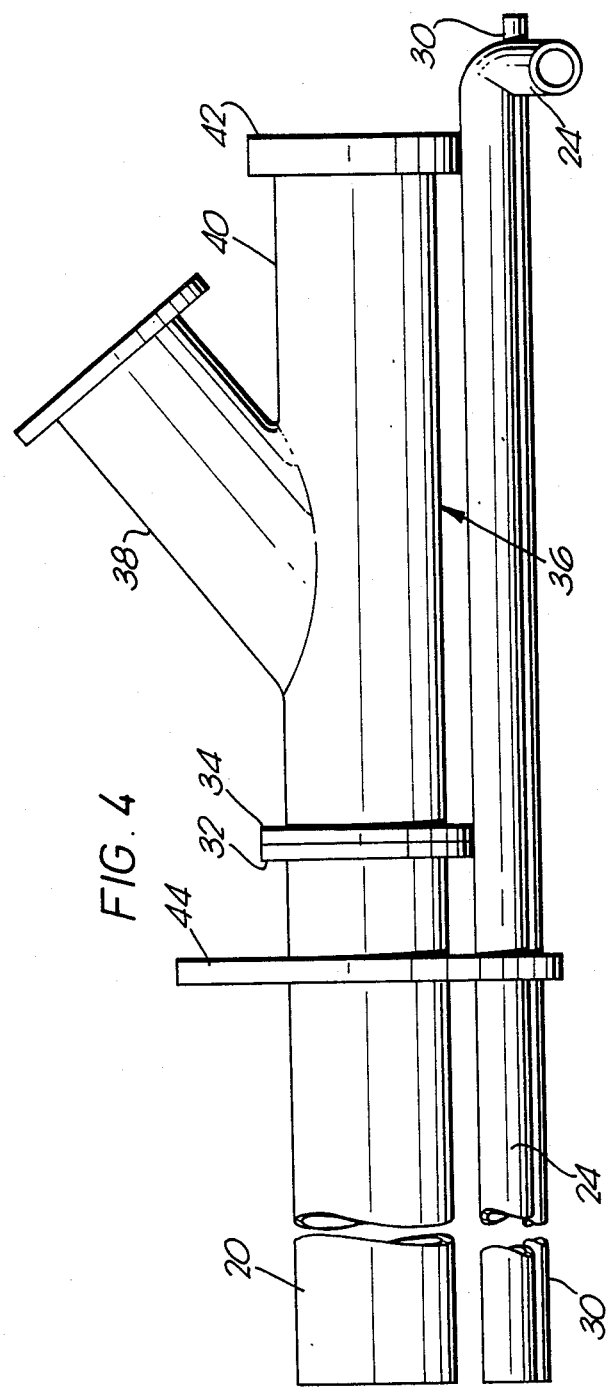

FLAME TREATMENT METHOD AND APPARATUS

BACKGROUND TO THE INVENTION

This invention relates to flame treatment method and apparatus and is particularly concerned with oxy-fuel burners, particularly but not necessarily of the kind that burn particulate coal. Such burners are described in, for example, UK patent specifications 2,099,132 A, 2,146,758 A, and 2,141,815 A and have a configuration of passages to produce a flame that is generally co-axial with the axis of the burner itself. Accordingly, when the burner is employed through a side wall of a furnace or other enclosure to heat a burden at the bottom of the furnace, difficulties can arise in ensuring uniform heating of the given surface area of the burden. (The term 'burden' is used herein to mean any solid or liquid substance that is to be heat treated in the furnace.) These difficulties can be amerliorated by arranging for the burner axis to point downwards rather than mounting the burner horizontally. However, such a downward orientation of the burner makes fitment of it to the enclosure more difficult and may not be able totally to solve the problem of localised cold spots being formed.

It is an aim of the present invention to provide an improved flame treatment method and apparatus which makes it possible to ameliorate or overcome the above-described problem, particularly when the source of fuel is particulate coal.

SUMMARY OF THE INVENTION

According to the present invention, there is provided a method for the heat treatment of a burden in a vessel having a side wall, comprising firing an oxy-fuel burner through a port in the side wall, the burner having at least two separate oxygen passages which terminate in separate outlets, wherein the disposition of the outlets are such that the flame is caused to curve towards the burden and the relative rates of supply of oxygen to the passages are so varied that the flame is moved across at least part of the burden.

The invention also provides apparatus for heat treatment of the burden in a vessel having a side wall, including an oxy-fuel burner which in use fires through a port in the side wall, the burner having at least two separate oxygen passages which terminate in separate outlets, and which are disposed such that in use the burner flame is able to be caused to curve towards the burden and wherein by varying the relative rates of supply of oxygen to the passages the flame is able to be moved across at least part of the burden.

The method and apparatus according to the invention enable the burner to be mounted horizontally, while still obtaining direct impingement of the flame, if so desired, on the surface of the burden. Moreover, since it is possible to move the flame across the burden, a single burner may be used to heat a substantial surface area without there being any substantial tendency for non-uniform heating to arise.

In prefered embodiments of burners for use in the method and apparatus according to the invention, there are two oxygen passages, one having an outlet terminating below and to one side of the longitudinal axis of the burner and the other having an outlet terminating below and to the other side of the longitudinal axis of the burner, whereby supply of oxygen through the passages causes the flame to curve towards the burden, and by varying respectively the rates of supply of oxygen to the passages the flame may be moved from one side to the other of the burner axis. Typically, the flame may be moved through an arc that subtends an angle of up to 60°.

The method and apparatus according to the invention are particularly intended to be used when burning particulate coal. The coal may be carried in air or in water or by another medium.

Typically, there are just the two said passages for oxygen, but if desired further passages may be provided. For example, a third passage may be provided having an axis below but in the same vertical plane as the burner axis.

BRIEF DESCRIPTION OF THE DRAWINGS

The method, apparatus and burners according to the invention will now be described by way of example with reference to the accompanying drawings, in which:

FIG. 4 is a schematic side elevation of an alternative burner for use in the apparatus shown in FIG. 1;

The drawings are not to scale.

DETAILED DESCRIPTION OF THE INVENTION

Figure 1:
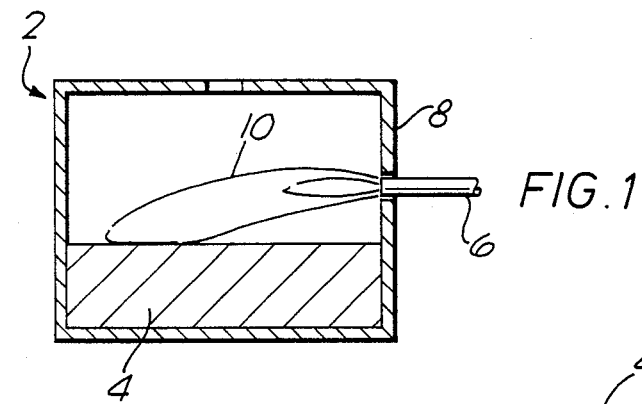
FIG. 1 is a schematic side elevation of an apparatus according the invention.

Referring to FIG. 1 of the drawings a furnace vessel 2 contains a burden 4. The furnace may be employed, for example, in the melting, smelting, refining or other treatment of a metal or alloy. Alternatively, it may be employed in the heat treatment, melting, or manufacture of minerals or other non-metallic substances. The vessel 2 has a burner 6 extending horizontally through its side wall 8. The burner 6 is mounted above the surface of the burden 4. In operation, the burner 6 creates a flame which extends across the surface of the burden 4 almost to the side of the vessel opposite the wall 8. In addition, although the burner is at a level typically at least at one meter above the surface of the burden, the flame 10 extends downwards and impinges against the surface of the burden 4. As shown in FIG. 1, the tip of the burner 6 may be flush with the inner surface of the wall 8 of the furnace vessel 2 or alternatively may extend beyond that surface. The burner 6 is capable of operation such that its flame is able to be displaced relative to the horizontal axis of the burner either to one side or the other. Typically, movement of the flame between extreme positions causes the flame to describe an arc subtending an angle in the order of 60°. The arc may typically be 2 meters long. Typically, the flame itself may have a length in the order of 5 meters. Although as shown in FIG. 1, the furnace 2 is equipped with only one burner 6, a plurality of such burners may be employed, the number chosen depending upon the dimensions of the furnace and on whether such burners are the sole means of heating the furnace or whether there is another means in addition. It is to be understood that since the flame can be translated through an arc in the order of 60°, the burner may readily be employed to prevent the occurence of local "cold spots" where, for example, material to be melted is fed onto the surface of the burden.

Figure 3:
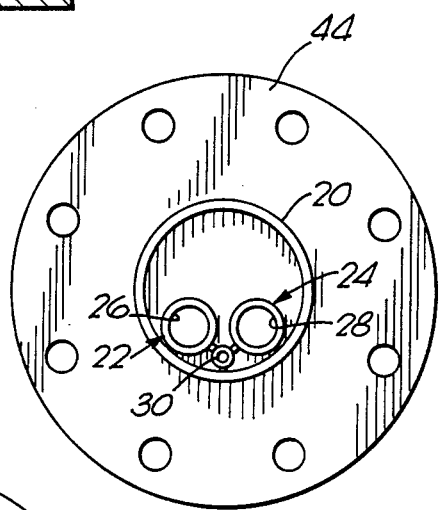
FIG. 3 is a front view of the burner shown in FIG. 2.
Figure 2:
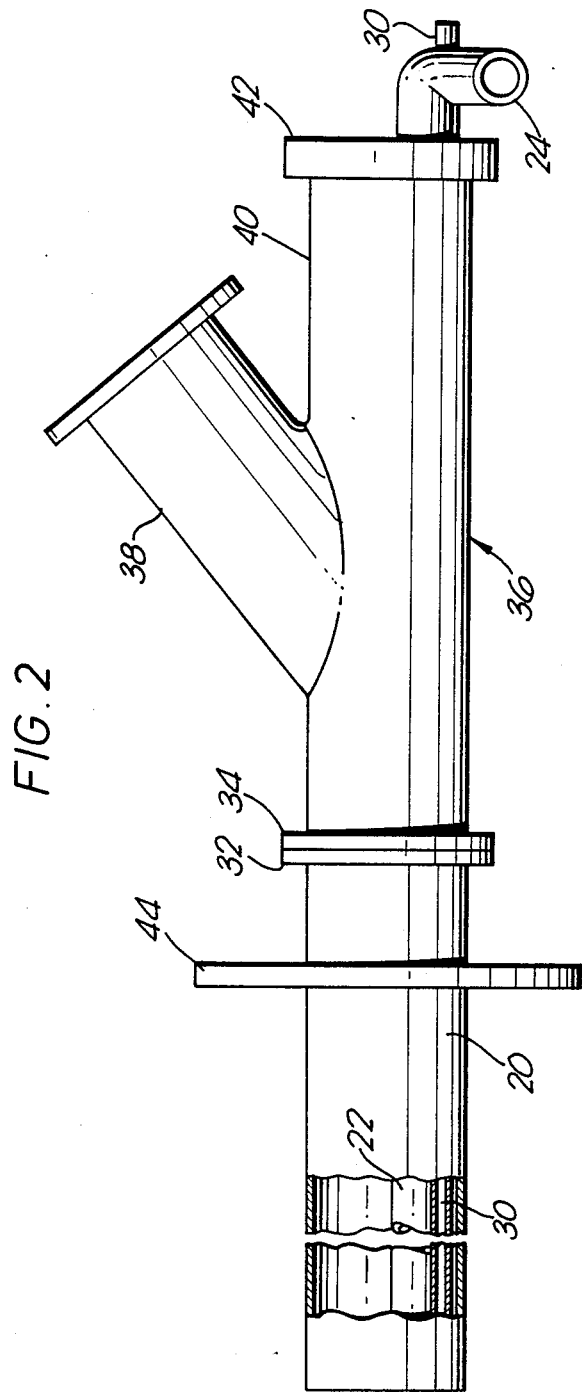
FIG. 2 is a schematic side elevation of a burner used in the apparatus shown in FIG. 1.

One burner suitable for use as a burner 6 is now described with reference to FIGS. 2 and 3. The burner is of simple construction. It comprises a main pipe or tube 20 for fuel. The pipe or tube 20 may simply be fabricated of mild steel. The burner illustrated in FIGS. 2–4 is particularly intended for operation with a particulate coal fuel. The coal particles may be of any convenient size, but preferably, at least 90% of the particles the size of 50 microns. Such coal is often referred in the art as "micro-coal" and tests the commercially valuable property of being non-abrasive. Accordingly, abrasive wear of the tube 20 is kept to a minimum. The coal is supplied to the burner 6 in any suitable fluidised form.

Typical fluidising media are air and water. There is a wide range of ratios of carrier to coal that can be employed. For example, the mixture of coal and air can be a so-called dilute phase with a ratio by weight of air to coal of 2:1 or so-called dense phase with a ratio by weight of air to coal of 1:10 or the mixture of coal and air can have any ratio therebetween. Typically, the ratio is in the range of 1:1 to 1:10. The velocity of the supply may similarly vary between wider limits. Typically, the velocity can vary from 2 meters per second to 200 meters per second, though normally will not be in excess of 40 meters per second.

The illustrated burner is of the tip-mix kind having two separate oxygen passages defined by pipes or tubes 22 and 24 which extend within the pipe 20. Both the pipes 22 and 24 have longitudinal axes that are horizontal and extend in planes parallel to the plane containing the longitudinal axis of the pipe 20. One oxygen pipe 22 has its outlet 26 terminating below and to one side of the longitudinal axis of the pipe 20 and the other oxygen pipe 24 has its outlet 28 terminating below and to the other side of the longitudinal axis of the pipe 20. The ends 26 and 28 of the pipes 22 and 24 respectively terminate in the same plane as the end of the pipe 20, although this is not essential. Similarly, it is not essential that the axes of the pipes 22 and 24 be precisely horizontal. The positioning of the oxygen pipes 22 and 24 is determined by the need for the overall supply of oxygen to be such as to cause the burner flame to curve towards the burden and typically to impinge upon its surface. Thus, the oxygen pipes 22 and 24, which are typically connected to a source of commercially pure oxygen, although oxygen-enriched air could be used instead, generally direct the oxygen towards the under regions of the flame. This helps to protect the refractory walls of the furnace, particularly if it has a refractory roof, and it also keeps the top of the flame typically from 100° to 400° C. cooler than its underneath part. Accordingly, there is a tendency for the majority of the radiant heat generated by the flame to be directed downwards towards the burden. The actual flame temperature achieved depends in part on the ratio of coal to air and also on the rate at which oxygen is supplied to the flame through the pipes 22 and 24. If the ratio is 1:1 then the flame will deviate neither to the left nor the right. If the rate of supply of oxygen to the pipe 22 is greater than that to the pipe 24, however, the flame will be steered to the left (with reference to FIG. 3.) On the other hand, if the rate of supply of oxygen to the pipe 24 is in excess of that to the pipe 22 the flame will be steered to the right (with reference to FIG. 3). Typically, the ratio may be varied from 4:1 (that is the supply of oxygen being four times greater to the pipe 22 than to the pipe 24) to 1:4 (that is the rate of supply of oxygen to the pipe 24 being four times greater than to the pipe 22), these two ratios representing the two laterally extreme positions that the flame is capable of being moved between. The oxygen supply may be controlled by manually operable flow valves (not shown) associated with the pipes 22 and 24, or automatically by automatic control valves (not shown). If desired, the burner may be provided with a controller (not shown) that is able to vary the flame position by changing the ratio of the oxygen supply to the pipes 22 and 24 in a predetermined manner.

The total rate of supplying molecular oxygen to the flame may remain constant even though its apportionment between the pipes 22 and 24 may vary, or alternatively, the total rate of supply of molecular oxygen may be varied during a heating operation to vary the flame length. Generally, the greater the rate of supply of oxygen to the flame, the shorter the flame length. Thus, not only can the angular displacement of the flame be adjusted in accordance with the invention, but so may its actual length. In addition, the total rate of supply of oxygen to the pipes 22 and 24 and of air to the pipe 20 will be chosen so as to give a desired flame stoichiometry.

If it is required for the flame to be oxidising, there is supplied a stoichiometric excess of oxygen over fuel. On the other hand, if is desired that the flame be reducing, there is supplied a stoichiometric excess of fuel over oxygen. It is also possible to provide a neutral flame, that is one in which the rate of supply of oxygen and the rate of fuel are stoichiometrically matched.

The burner is preferably provided with a pipe 30 through which fuel or a mixture of fuel and air can be provided to form a pilot light. The pipe 30 extends into and through the pipe 20. The axis of the pipe 30 extends parallel to and in the same plane as the axis of the pipe 20. The pilot light may be lit by any conventional means, for example a piezoelectric ignitor (not shown). Typically, the pilot light is maintained only while the main flame is getting up to temperature. For example, the supply of fuel and air to the passage 30 may be discontinued once the flame temperature has reached, say, 700° or 750° C.

The pipe 20 has at its end opposite its tip a flange 32 which is connected to a complementary flange 34 of a bifurcated and member 36 having an upper supply duct 38 for a fuel medium comprising particulate coal carried in air and a horizontal duct 40 fitted at its end with a closure 42 through which the pipes 22, 24 and 30 all extend and with which these pipes are sealingly engaged. The duct 38 extends downwardly from its inlet and at an angle to the vertical to facilitate feeding of the particulate coal (preferably 'micro-coal') into burner.

The pipe 20 also carries a second flange 44 to facilitate its fitment to the wall of the vessel in FIG. 1.

It is found in practice that the coal exiting the tip of the burner 6 acts as a black body protecting the burner against radiation. Accordingly, it is frequently not necessary to employ any water jacket or other cooling system for the burner.

Figure 5:
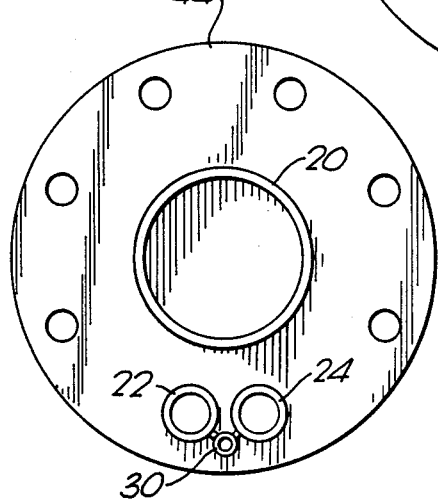
FIG. 5 is a front view of the burner shown in FIG. 5.

It is not necessary for the pipes 22, 24 and 30 to be disposed within the main burner pipe 20. As shown in FIGS. 4 and 5, the pipes 22, 24 and 30 may extend outside, but underneath, the pipe 20. In other respects, the burner shown in FIGS. 4 and 5 is entirely analogous with the burner shown in FIGS. 2–4 and accordingly, it will not be described further herein.

In a typical example of the operation of burner shown in FIGS. 2 and 3 or FIGS. 4 and 5, the burner 6 in the apparatus shown in FIG. 1, the coal may be supplied to the burner at rate of 500 kilograms per hour. Typically, the ratio of coal to air is such that the oxygen in the air provides 15% of the oxygen required for stoichiometric combustion of the coal. Oxygen is supplied to the pipes 22 and 24 such that it exits the pipes that have the pipes at a velocity of 180 meters per second. The overall rate of supply of oxygen to the pipes 22 and 24 are such that the stoichiometric flame can be varied between reducing, neutral and oxidising.

We claim:

1. A method for the heat treatment of a burden in a vessel having a side wall, comprising firing an oxy-fuel burner through a port in the side wall, the burner having at least two separate oxygen passages which terminate in separate outlets, wherein the disposition of the outlets are such that the flame is caused to curve towards the burden and the relative rates of supply of oxygen to the passages are so varied that the flame is moved across at least part of the burden.

2. A method according to claim 1, in which one of the two oxygen passages has an outlet terminating below and to one side of the longitudinal axis of the burner or its fuel passage and the other has an outlet terminating below and to the other side of the longitudinal axis of the burner or its fuel passage, whereby supply of oxygen through the passages causes the flame to curve towards the burden, and the step of varying the respective rates of supply of oxygen to the said passages moves the flame from one side to the other of the burner axis.

3. A method according to claim 2, in which the total rate of supply of oxygen to said passages remains unaltered.

4. A method according to claim 2, in which the relative rates of supply of oxygen to the two passages are varied between limits of 4 to 1 and 1 to 4.

5. A method according to claim 1, in which the flame is moved through an arc that subtends an angle of up to 60°.

6. A method according to claim 1, in which the axis of the burner is horizontal.

7. A method according to claim 1, in which the fuel is particulate coal.

8. A method according to claim 7, in which the particulate coal is carried in air.

9. A method according to claim 7, in which the particulate coal is carried in water.

10. A method according to claim 1, in which, excluding any pilot light passage, the burner has but a single passage for fuel and but two passages for oxygen.

11. Apparatus for the heat treatment of a burden in a vessel having a side wall, including an oxy-fuel burner which in use fires through a port in the side wall, the burner having a fuel passage which is generally horizontal and at least two separate oxygen passages which extend below the fuel passage, which terminate in separate outlets and which are disposed such that in use the burner flame is able to be caused to curve towards the burden located below the outlets and wherein by varying the relative rates of supply of oxygen to the passages the flame is able to be moved across at least part of the burden.

12. Apparatus according to claim 11, in which the burner has two oxygen passages, one having an outlet terminating below and to one side of the longitudinal axis of the burner and the other having an outlet terminating below and to the other side of the longitudinal axis of the burner or its fuel passage, whereby in use supply of oxygen through the oxygen passages causes the flame to curve towards the burden, and whereby in use the flame may be cause to move from one side to the other of the burner axis by variation of the respective rates of supply of oxygen to the said oxygen passages.

13. Apparatus according to claim 11, in which there are just two passages for the supply of oxygen.

14. A burner for heat treatment of a burden and having a fuel passage which is generally horizontal and at least two separate oxygen passages which extend below the fuel passage, which terminate in separate outlets and which are disposed such that in use the burner flame is able to curve away from its axis and toward the burden located below the outlets and wherein by varying the relative rates of supply of oxygen to the passages the flame is able to be moved across a chosen area of the burden.

15. A burner according to claim 14, in which the burner has two oxygen passages, one having an outlet terminating below and to one side of the longitudinal axis of the burner and the other having an outlet terminating below and to the other side of the longitudinal axis of the burner or its fuel passage, whereby in use supply of oxygen through the oxygen passages causes the flame to curve towards the burden, and whereby in use the flame may be caused to move from one side to the other of the burner axis by variation of the respective rates of supply of oxygen to said oxygen passages.

* * * * *